(12) United States Patent
Medalion et al.

(10) Patent No.: US 12,164,859 B2
(45) Date of Patent: Dec. 10, 2024

(54) METHOD FOR SUMMARIZATION AND RANKING OF TEXT OF DIARIZED CONVERSATIONS

(71) Applicant: GONG.IO LTD, Ramat Gan (IL)

(72) Inventors: Shlomi Medalion, Ramat Gan (IL); Inbal Horev, Ramat Gan (IL); Raz Nussbaum, Ramat Gan (IL); Omri Allouche, Tel Aviv (IL); Raquel Sitman, Tel Aviv (IL); Ortal Ashkenazi, Kfar Saba (IL)

(73) Assignee: GONG.IO LTD, Ramat Gan (IL)

( * ) Notice: Subject to any disclaimer, the term of this patent is extended or adjusted under 35 U.S.C. 154(b) by 381 days.

(21) Appl. No.: 17/830,255

(22) Filed: Jun. 1, 2022

(65) Prior Publication Data

US 2023/0394226 A1 Dec. 7, 2023

(51) Int. Cl.
| | | |
|---|---|---|
| *G06F 17/00* | (2019.01) | |
| *G06F 16/28* | (2019.01) | |
| *G06F 40/166* | (2020.01) | |
| *G06F 40/253* | (2020.01) | |
| *G06F 40/279* | (2020.01) | |
| *G06F 40/35* | (2020.01) | |
| *G10L 17/14* | (2013.01) | |
| *G10L 21/0272* | (2013.01) | |

(52) U.S. Cl.
CPC .......... *G06F 40/166* (2020.01); *G06F 16/285* (2019.01); *G06F 40/253* (2020.01); *G06F 40/279* (2020.01); *G06F 40/35* (2020.01); *G10L 17/14* (2013.01); *G10L 21/0272* (2013.01)

(58) Field of Classification Search
CPC .... G06F 16/285; G06F 16/284; G06F 16/283; G06F 16/28; G06F 16/31; G06F 16/35; G06F 16/353; G06F 40/10; G06F 40/166; G06F 40/12; G06F 40/123; G06F 40/103; G06F 40/117; G06F 40/20; G06F 40/253; G06F 40/279; G06F 40/35; G06F 40/30; G10L 17/14; G10L 21/0272
See application file for complete search history.

(56) References Cited

U.S. PATENT DOCUMENTS

| | | |
|---|---|---|
| 6,219,639 B1 | 4/2001 | Bakis et al. |
| 7,831,427 B2 | 11/2010 | Potter et al. |
| 8,214,242 B2 | 7/2012 | Agapi et al. |
| 9,479,736 B1 | 10/2016 | Karakotsios |
| 9,571,652 B1 | 2/2017 | Zeppenfeld et al. |
| 10,134,400 B2 | 11/2018 | Ziv et al. |

(Continued)

*Primary Examiner* — Michael Ortiz-Sanchez
(74) *Attorney, Agent, or Firm* — Amster, Rothstein & Ebenstein LLP

(57) ABSTRACT

Methods for generating a categorized, ranked, condensed summary of a transcript of a conversation, involving obtaining a diarized version of the transcript of the conversation, storing textual monologues from the transcript, determining classifications as to the textual monologues based on a classifier algorithm, associating the classifications with the textual monologues, creating textually-modified rephrasings of the textual monologues based on text and classification thereof, storing the textually-modified rephrasings, aggregating the textually-modified rephrasings based on associated clustering and scoring, and transmitting summary information pertaining to the aggregated textually-modified rephrasings to a user device.

28 Claims, 14 Drawing Sheets

(56) References Cited

U.S. PATENT DOCUMENTS

| | | |
|---|---|---|
| 10,546,575 B2 | 1/2020 | Dimitriadis et al. |
| 2007/0120966 A1 | 5/2007 | Murai |
| 2014/0142940 A1* | 5/2014 | Ziv .................. G10L 17/02 |
| | | 704/235 |
| 2017/0004178 A1 | 1/2017 | Ponting et al. |
| 2018/0166066 A1 | 6/2018 | Dimitriadis et al. |
| 2018/0176508 A1 | 6/2018 | Pell |
| 2018/0197548 A1 | 7/2018 | Palakodety et al. |
| 2018/0286412 A1 | 10/2018 | Amsterdam et al. |
| 2018/0329882 A1* | 11/2018 | Bennett ............... G06N 20/00 |
| 2018/0376108 A1 | 12/2018 | Bright-Thomas et al. |
| 2019/0318743 A1 | 10/2019 | Reshef et al. |
| 2019/0341050 A1 | 11/2019 | Diamant et al. |
| 2019/0386937 A1* | 12/2019 | Kim ................. G06F 40/268 |
| 2021/0124876 A1* | 4/2021 | Kryscinski ........... G06F 16/345 |
| 2021/0280197 A1 | 9/2021 | Wang et al. |
| 2021/0343282 A1 | 11/2021 | Mane et al. |
| 2021/0365773 A1* | 11/2021 | Subramanian ........ G06F 40/166 |
| 2021/0383127 A1 | 12/2021 | Kikin-Gil et al. |
| 2022/0115019 A1* | 4/2022 | Bradley ............. G06F 3/04842 |
| 2022/0122615 A1 | 4/2022 | Chen et al. |
| 2022/0157322 A1 | 5/2022 | Reshef et al. |
| 2022/0189489 A1 | 6/2022 | Peeler et al. |
| 2022/0375492 A1 | 11/2022 | Grangier et al. |
| 2023/0054726 A1* | 2/2023 | Roy .................. G06F 16/35 |
| 2023/0154456 A1 | 5/2023 | Bassani et al. |
| 2023/0162733 A1 | 5/2023 | Moorsom et al. |
| 2023/0297761 A1* | 9/2023 | Rohde ................ G06F 40/35 |
| 2023/0297778 A1* | 9/2023 | Can .................. G06F 40/284 |
| 2024/0249082 A1* | 7/2024 | Laban ................ G06F 40/166 |

* cited by examiner

| entity | monologue | summary |
|---|---|---|
| pain | So, I'm the head of cyber security in our company, and we have a huge problem of employees that open phishing emails. | Employees open phishing emails. |
| contact role | So, I'm the head of cyber security in our company, and we have a huge problem of employees that open phishing emails. | Head of cyber security |
| pain | I'm Ron, and I'm a real estate agent. What we cannot do these days is to go to each property and take photos. It sometimes takes a few hours driving just to get to the property. On the other hand, our clients' photos are awful. | Takes too much time to get to properties for taking photos; Cannot trust photos taken by clients. |
| contact role | I'm Ron, and I'm a real estate agent. What we cannot do these days is to go to each property and take photos. It sometimes takes a few hours driving just to get to the property. On the other hand, our customers' photos are awful. | Real estate agent |
| concerns | We're really concerned about a data leak from your application. It's crucial for us that our customers' data will not find its way to the darknet somehow. | Concerned about data-leakage using the app. |
| ... | | ... |

FIG. 5

```
call = get_call(call_id)
call_monologues = parse_call_to_monologues(call)

for monologue_id, monologue in call_monologues:
    monologue_entities[monologue_id] = classify_monologue_to_entities(monologue)
    for entity in monologue_entities:
        summaries, ranking_scores_base = rephrase_monologue(monologue, entity)
        summaries[entity] += (summary, ranking_score_base)

for entity in all_entities:
    entity_summaries, ranking_scores_base = summaries[entity]
    entity_final = aggregate_summaries(entity_summaries, ranking_scores_base)

# the aggregate_summaries() function also calculates the score for each sentence in the
# aggregated summary according to the number of times the specific pain was mentioned, in
# addition to the scores of each mention of this pain calculated in rephrase_monologue().

aggregated_entities[entity] += entity_final output = form_document_from_aggregation(aggregated_entities)
```

FIG. 6

```
def rephrase_monologues(monologue, entity):
    summary = rephrasing_model[entity].rephrase(monologue)
    ranking_score_base = local_ranking_model[entity].get_ranking_score(monologue)

return summary, ranking_score_base
```

FIG. 7

```
def rephrase_monologues(monologue, entity):
    summary, ranking_score_base =
    rephrasing_and_ranking_model[entity].rephrase_and_rank(monologue)
    return summary, ranking_score_base
```

FIG. 8

```
def aggregate_summaries(entity_summaries, ranking_scores_base):
    entity_summaries.items_vectors = embedding_model(entity_summaries) # returns an embedding vector for each item.
    entity_summaries.items_cluster = cluster(items_vectors) # gives a cluster id for each of the items.
    ranking_scores_base = entity_summaries.items_cluster # same clusters are also for the ranking_scores_base which
    correspond directly to the items in entity_summaries.

# each item in entity_summaries is now applied to a specific cluster. all items with same cluster_id will be aggregated
    to a single item in the final summary.

entity_final_items = []
    for cluster_id in set(items_clusters):
        cluster_items = [item for item in entity_summaries if item.items_cluster==cluster_id]
        item_total_duration = calculate_total_duration(cluster_items)
        item_final_ranking_score = aggregate_scores(item_total_duration, [base_score for base_score in
        ranking_scores_base if ranking_scores_base.items_cluster==cluster_id])
        item_final_summary = aggregation_model(entity).re_summarize(cluster_items)

entity_final_items.append((item_final_summary, item_final_ranking_score))

return entity_final_items
```

FIG. 9

```
def aggregate_scores(duration, base_scores):
    return duration*max(base_scores)
```

FIG. 10

For the following monologues, find the speaker's role and responsibilities:

"""

Monologue: "I'm Betty, and I'm an account executive at GalapagosCorp. I talk with potential customers and try to close deals."
Role: account executive
Responsibilities: talk with potential customers to close deals.

"""

"""

Monologue: "My name is Josh Hammershlagm and I'm the head of security at FicusCorp."
Role: head of security
Responsibilities:

For the following monologues, find the speaker's role and responsibilities:

"""

Monologue: "I'm Betty, and I'm an account executive at GalapagosCorp. I talk with potential customers and try to close deals."
Role: account executive
Responsibilities: talk with potential customers to close deals.

"""

Monologue: "My name is Josh Hammershlagm and I'm the head of security at FicusCorp."
Role: head of security
Responsibilities:

"""

Monologue: "And I'm the head of marketing at DartingCorp. I'm responsible for defining the marketing strategy of the entire company, and I'm managing 3 different channels. The US channel, the EU channel and the Asia channel."

FIG. 12

*Role: head of marketing*
*Responsibilities: marketing strategy of the company; US, EU and Asia channels.*

FIG. 13

METHOD FOR SUMMARIZATION AND RANKING OF TEXT OF DIARIZED CONVERSATIONS

FIELD OF THE INVENTION

The present invention relates generally to methods, apparatus, programmed products and software for summarizing recorded calls and transcripts thereof.

BACKGROUND

Front-line managers involved in sales have multiple responsibilities. For example, such front-line managers manage and supervise several account executives. Front line managers are also responsible for overseeing sales processes and coaching account executives as to the sales process. Often, front line managers will listen to many complete sales calls involving the account executives, which is a time-consuming and error prone process.

Account executives also sometimes listen to their own sales calls or calls of other account executives, for example prior to an additional call with the same potential customer or buyer or prior to sending a follow-up email to such potential customer or buyer. Again, this is a time-consuming process, or if done quickly, important details may be missed.

Other individuals such as professionals, for example those in human resources and product development roles, may also find themselves involved in a time-consuming or inaccurate process of reviewing calls, for example calls relating to employee interactions, or calls relating to product development brainstorming or implementation, respectively, to name a few. The inventors of the present invention have realized there exist many fields where an individual or organization must make careful review of call transcripts in order to appropriately choose a course of action, while time resources for doing so may be finite.

There currently exist software and cloud-based approaches for agent training and quality control in the sales industry, for example those provided by IRIS CRM. For example, such systems may automatically record calls and provide access to the call recordings for manual review by a manager or other designated persons. Such systems may further offer a degree of CRM integration and present basic analytics, for example regarding call duration, inbound talk time, outbound talk time, and a number of calls made by a particular agent.

In general, in non-sales specific contexts, algorithms exist for rephrasing of blocks of text. For example, such approaches may accept a single statement or short group of statements as inputs and provide a shortened version thereof as an output. These conventional systems, however, suffer from a common technical problem in that as the number of characters in the inputted blocks of text grow, processing and/or memory usage become unmanageable such that these conventional systems are not effective for use with significantly-sized blocks of text.

The DIALOGLM approach proposes, in order to handle longer dialogues, the use of a window-based denoising approach for generative pre-training in which the approach corrupts a window of text with dialogue-inspired noise, and guides the model to reconstruct this window based on the content of the remaining conversation, and augmenting the model with sparse attention combined with conventional attention in a hybrid manner. However, as the inventors of the present invention have realized, such approach not only employs computationally and resource-intensive preprocessing, but also fails to take into account categorization information that the inventors have realized to be helpful in computationally efficiently providing a summary, and in automatically presenting that summary organized in a manner of particular value in a sales context. Moreover, as the inventors of the present invention have further realized, while a focus of DIALOGLM is to capture key aspects from a text and summarize those key aspects, DIALOGLM fails to organize or present summarizations in a conceptually-grouped manner that would be helpful to individuals having specific roles (such as manager, account executive, or Chief Revenue Officer) in the sales space or other spaces such as HR and product development where specific roles (e.g. officer, boss, temporary worker, trainee, intern, product development lead, bug tester, etc.) may be of particular relevance in reviewing a call.

Other approaches potentially capable of handling relative larger conversation lengths, such as approaches of the Wordcab system, provide structured and manually arrangeable JSON responses as summaries, and provide tools for limited modification of such summaries (e.g. with respect to modifying speaker names and the length of the summary), likewise, as the inventors of the present invention have realized, again fail to take into account categorization information that the inventors have realized to be helpful in computationally efficiently providing a summary, and in automatically presenting that summary organized in a manner of particular value in a sales context, or of particular value in other professional or nonprofessional contexts.

Further, conventional systems that parse text segments, or simply identify occurrences of particular words or phrases within text segments that have a positive or negative sentiment, do not allow for differentiating parts of an entire conversation based on who the speakers are and are unable to identify and remove redundancies within presentation categories, such as categories of key importance to salespeople and front-line managers or of key importance to those in other roles.

Thus, these conventional algorithms and scripts are unable to provide output useful in increasing accuracy and speed of review of complex, multi-speaker calls, particular sales calls.

In general, the inventors of the present invention have realized that prior summarization algorithms fail to provide summarizations appropriately generated and presented for specific roles, such as managers (e.g. with summaries organized and presented specifically with respect to coaching opportunities for the manager's account executives, or a combination of areas of importance to such account executives or a specific individual), Chief Revenue Officers (e.g. organized and presented specifically with respect to approximated revenue, or a combination of areas of importance to such account executives or a specific individual), and account executives (e.g. organized and presented specifically with respect to customers' pains and needs, or a combination of areas of importance to such account executives or a specific individual), or other specific roles in sales and non-sales contexts.

Accordingly, it would be desirable to provide systems, methods, programmed products and software that overcome these and other problems.

SUMMARY OF INVENTION

In view of the above, it is the object of the present disclosure to provide improved systems, methods, programmed products and software to overcome, through novel combinations of heuristic and/or machine learning techniques, including such techniques pertaining to natural language processing, clustering, and scoring, the technological challenges faced in conventional approaches for call review and text rephrasing, and particularly to automated summarization of transcripts or diarized versions of calls in a manner retaining and emphasizing key information in professional industries, for example sales, human resources, and product development, to name a few.

It is a further object of the present disclosure to provide improved systems, methods, programmed products and software that, while summarizing conversations, appropriately differentiate text segments corresponding to individual monologues from a transcript of a sales or other conversation for rephrasing purposes, while at the same time tracking relationships and similarities between such individual monologues, so as to increase processing speed while at the same time making use of clustering information for both sorting and redundancy-removal purposes in an ultimate presentation of summary information to a user.

It is a further object of the present disclosure to present summary information pertaining to a sales call, or other call used in other industries, for example human resource or product development, in a manner that rephrases the textual content thereof and determines appropriate categorizations for presentation of such rephrased textual content.

It is a further object of the present disclosure to provide improved systems, methods, programmed products and software that not only shorten transcripts or diarizations of calls, e.g. sales calls and calls of interest to other industries or roles such as human resources and product development, but also further improve the accuracy, usefulness and efficiency of the summarizations, while decreasing consumption of computational resources when employed across the lengthy and complicated text of a diarized multi-speaker transcript, by (i) removing redundancies, for example through employing clustering algorithms to identify such redundancies (ii) determining relative importance of items raised during the calls according to scoring methodologies, including scoring methodologies that advantageously make use clustering algorithms (iii) presenting items within the summaries based on their relative importance, (iv) presenting items within key industry-specific categories based on determinations of category fit, (v) identifying contextual and referential relationships between several of a plurality of statements or monologues occurring at different points in a call, e.g. taking into consideration statements by a particular speaker across various portions of the multi-speaker transcript, and/or (vi) automatically selecting one or more specialized models (e.g. specialized heuristic and machine learning approaches specially adapted therefor), for example according to particular identified categories, to accomplish aspects of the foregoing functionalities.

There is therefore provided, in accordance with exemplary embodiments of the invention, a method for generating a categorized, ranked, condensed summary of a transcript, the method involving (a) receiving, by a computer system, an input of content from a transcript of a conversation, by (1) obtaining, by the computer system, a diarized version of the transcript of the conversation, the diarized version including (a) a first plurality of textual monologues of a first speaker in the conversation associated with an indication of the first speaker, and (b) a second plurality of textual monologues of a second speaker in the conversation associated with an indication of the second speaker, and (2) storing, by a processor of the computer system, at least the first plurality of textual monologues and the second plurality of textual monologues in one or more databases located in one or more memories operatively connected to the processor, (b) determining, by the processor, one or more classifications, from amongst a plurality of predetermined classifications, as to each textual monologue of the first plurality of textual monologues and as to each textual monologue of the second plurality of textual monologues, based on a classifier algorithm employing natural language processing, (c) associating, by the processor, within the one or more databases, each textual monologue of the first plurality of textual monologues and each textual monologue of the second plurality of textual monologues with the respective one or more classifications, (d) creating by the processor, textually-modified rephrasings, for one or more of the first plurality of textual monologues and for one or more of the second plurality of textual monologues, based on respective text of the textual monologue and at least one of the respective one or more classifications of the textual monologue, (e) storing, by the processor, the textually-modified rephrasings, in the one or more databases, (f) aggregating the textually-modified rephrasings by (1) sorting, by the processor, within the one or more databases, the textually-modified rephrasings into a plurality of categories based on the respective one or more classifications, (2) determining, by the processor, using a clustering algorithm, at least one clustering in the one or more databases of a plurality of same or similar textually-modified rephrasings within at least one the plurality of categories, (3) scoring, by the computer system, a plurality of textually-modified rephrasings in the one or more databases based at least on the at least one clustering, (4) converting, in the one or more databases, by the processor, a plural number of same or similar textually-modified rephrasings within at least one of the plurality of categories, into a counting number of textually-modified rephrasings, based on the at least one clustering, wherein the counting number is less than the plural number, (5) sorting within the one or more databases, by the processor, within at least one of the plurality of categories, the associated textually-modified rephrasings, based on the scoring, and (6) incorporating, by the processor, the textually-modified rephrasings into summary information indicating a plurality of the plurality of categories, and for each of the indicated plurality of categories, associated textually-modified rephrasings ordered consistent with the sorting, and (g) transmitting, to a user device, the summary information, to be displayed.

In accordance with further exemplary embodiments of the invention, the obtaining, by the computer system, the diarized version of the transcript of the conversation, may be performed by generating, by the computer system, from a recorded or streaming conversation, the diarized version of the transcript of the conversation.

In accordance with yet further exemplary embodiments of the inventions, the classifier algorithm includes at least one machine learning algorithm trained according to at least one training set comprising a plurality of text segments tagged with respective indications of a specific classification from amongst the plurality of predetermined classifications.

In accordance with additional exemplary embodiments of the invention, at least one of the first plurality of textual monologues may be classified according to more than classification from amongst the plurality of predetermined classifications. At least one other of the first plurality of textual monologues may be classified according to exactly one classification from amongst the plurality of predetermined classifications. At least one other of the first plurality of textual monologues may be classified according to zero classifications from amongst the plurality of predetermined classifications.

In accordance with exemplary embodiments of the invention, the plurality of predetermined classifications may include at least one of: a role of a person, a responsibility of a person, a buyers pain, a buyer's concern, an objection, an action item, and a coaching opportunity.

In accordance with further exemplary embodiments of the invention, the classifier algorithm, in determining the one or more classifications for a first textual monologue of the first plurality of textual monologues, further employs context information derived from a second textual monologue of the first plurality of textual monologues. The context information may be a referential relationship, identified by the processor, between a pronoun in the first textual monologue and a noun in the second textual monologue.

In accordance with further exemplary embodiments of the invention, the classifier algorithm, in determining the one or more classifications for a first textual monologue of the first plurality of textual monologues, may further employ context information derived from a second textual monologue of the second plurality of textual monologues. The context information may be a referential relationship, identified by the processor, between a pronoun in the first textual monologue and a noun in the second textual monologue. The context information may be a question-and-response relationship, identified by the processor, between a question in the first textual monologue and a response in the second textual monologue.

In accordance with yet further exemplary embodiments of the invention, at least one of the textually-modified rephrasings may be a sentence.

In accordance with additional exemplary embodiments of the invention, the creating the textually-modified rephrasings may be performed, by the processor, by an algorithm receiving the respective associated textual monologue and the respective associated at least one classification as inputs. The algorithm may be at least one of: seq2seq recurrent neural network, a long short-term memory network, a transformer-based model, a bidirectional and auto-regressive transformer architecture, an encoder-decoder transformer-based architecture, and template filling.

In accordance with yet additional exemplary embodiments of the invention, the creating the textually-modified rephrasings may be selectively performed, by the processor, by one of a plurality of algorithms, selected according to the respective associated at least one classification, receiving the respective associated textual monologue as an input. The at least one of the plurality of algorithms may be at least one of: seq2seq recurrent neural network, a long short-term memory network, a transformer-based model, a bidirectional and auto-regressive transformer architecture, an encoder-decoder transformer-based architecture, and template filling.

In accordance with exemplary embodiments of the invention, the creating the textually-modified rephrasings, by the processor, may further be based on an identity or role of the respective speaker.

In accordance with further exemplary embodiments of the invention, the incorporating, by the processor, the textually-modified rephrasings into the summary information, may involve concatenating the textually-modified rephrasings within at least one of the plurality of categories.

In accordance with yet further exemplary embodiments of the invention, the scoring may be increased according to increased associated cluster size for the at least one clustering.

In accordance with additional embodiments of the invention, the scoring may also be based at least on an occurrence of specified wording in the associated textual monologue.

In accordance with further embodiments of the invention, the scoring may also be based at least on a length of the associated textual monologue.

In accordance with yet further embodiments of the invention, the scoring may also be based at least on an amount of speaking time associated with the associated textual monologue.

In accordance with other embodiments of the invention, the scoring may also be based at least on a relative positioning of the associated textual monologue within the diarized version of the transcript of the conversation. The scoring may be increased according to the relative positioning being closer to the middle of the conversation or decreased according to the relative positioning being closer to the beginning of the conversation or end of the conversation.

In accordance with additional embodiments of the invention, at least one of the textually-modified rephrasings incorporated into the summary information may include at least one link to a corresponding portion of the diarized version of the transcript.

In accordance with further embodiments of the invention, at least one of the textually-modified rephrasings incorporated into the summary information may include at least one link to a corresponding portion of an audio or audio-video recording of the conversation.

In accordance with yet further embodiments of the invention, the method further involves formatting, by the processor, within the one or more databases, the summary information into a document format configured for display on the user device.

BRIEF DESCRIPTION OF THE DRAWINGS

The above and related objects, features and advantages of the present disclosure will be more fully understood by reference to the following detailed description of the preferred, albeit illustrative, exemplary embodiments of the present invention when taken in conjunction with the accompanying figures, wherein:

FIG. 5 is a chart illustrating sample rephrasings of textual monologues according to associated classifications, in accordance with embodiments of the present invention;

FIG. 6 is sample pseudocode generating and outputting a summary form document from call content, in accordance with embodiments of the present invention;

FIG. 7 is sample pseudocode summarizing a call based on a rephrasing model and ranking scores, in accordance with embodiments of the present invention;

FIG. 8 is sample pseudocode summarizing a call based on a rephrasing and ranking model, in accordance with embodiments of the present invention;

FIG. 9 is sample pseudocode summarizing a call based according to determined clustering of monologues in that call, with multiple monologues having identical cluster identification being reduced in number, in accordance with embodiments of the present invention;

FIG. 10 is sample pseudocode aggregating and returning scores, in accordance with embodiments of the present invention;

FIG. 11 is a sample prompt usable with a rephrasing algorithm, in accordance with embodiments of the present invention;

FIG. 12 is a sample input usable with a pre-trained model, in accordance with embodiments of the present invention;

FIG. 13 is a sample output that may be produced by a pre-trained model, provided with the input of FIG. 12, in accordance with embodiments of the present invention.

DETAILED DESCRIPTION OF THE EXEMPLARY EMBODIMENTS

The present invention generally relates to improved systems, methods, programmed products and software to overcome the technological challenges faced in conventional approaches for transcripts, and in particular to automated summarization and of conversations between plural speakers and automated formatting of such summarization.

In exemplary embodiments, the present invention improves upon prior summarization techniques as applied to transcripts by utilizing classifier algorithms employing natural language processing and tied to diarized transcription data of the conversation, for example to determine monologue categorization.

In exemplary embodiments, the present invention also improves upon prior summarization techniques as applied to transcripts through creation and storage of textually-modified rephrasings of textual monologues, including based on such categorization or classification, and determining of clusterings of such rephrasings with a clustering algorithm. In exemplary embodiments, the present improves upon prior summarization techniques as applied to transcripts by using such clusterings for scoring of such rephrasings, for reduction in the number of such rephrasings in summary information.

In exemplary embodiments, the present invention also improves upon prior summarization techniques as applied to transcripts by using such scoring for intra-category scoring. In exemplary embodiments, the present invention improves upon prior summarization techniques as applied to transcripts by transmitting specially-formatted summary information to be displayed on a user device.

System Overview

Figure 1:
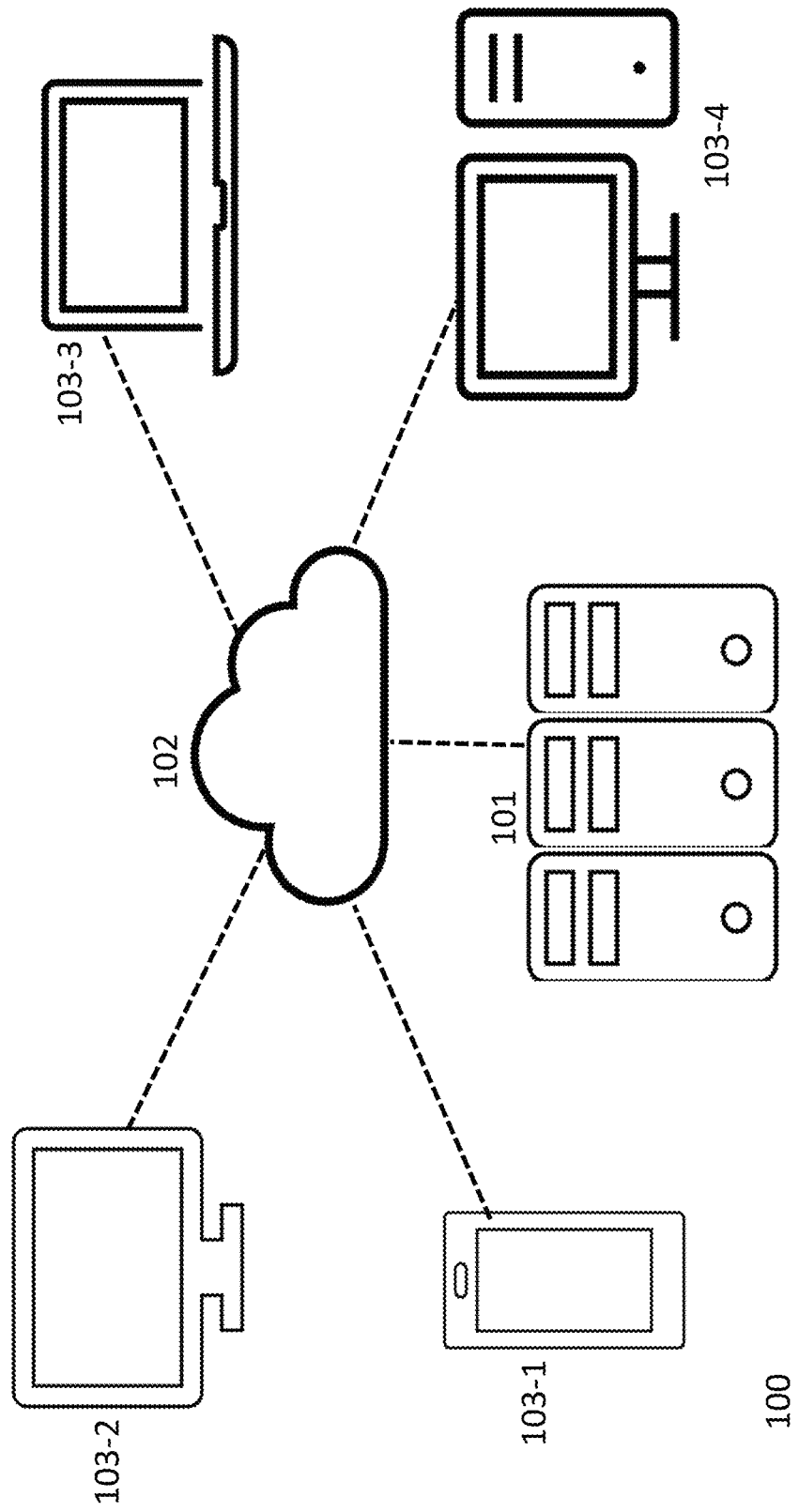
FIG. 1 is a schematic illustration of a system including a plurality of user devices communicating over the internet with one or more server computers in accordance with exemplary embodiments of the present invention.

FIG. 1 is a schematic pictorial illustration of a diarized transcript analysis and review system 100, according to an embodiment of the present invention. A computer, such as a server (or group of servers) 101, which may be referred to herein as a computer system, receives diarized transcripts of conversations conducted via a network 102 or conducted elsewhere. For example, such conversations may be conducted among pairs or groups of participants using respective user devices 103-1, 103-2, 103-3, 103-4. Network 102 may be or include any suitable data communication network, such as the Internet.

User devices 103-1, 103-2, 103-3, 103-4, may be any sort of computing devices with a suitable audio and/or visual review interface such as a screen or audio or printer output or other output, including both desktop and portable devices, such as laptops, tablets and smartphones, to name a few. While four user devices 103 are shown, one, two, three, four, or more user devices 103 may be used, for communication or for review purposes. Such system 100 or other systems may be used to create a diarized transcript of a conversation, as discussed for example in U.S. Application Ser. No. 17/651,204 (titled "METHOD FOR UNIQUELY IDENTIFYING PARTICIPANTS IN A RECORDED STREAMING TELECONFERENCE" and filed on Feb. 15, 2022) and Ser. No. 17/651,208 (titled "SYSTEM, METHOD AND PROGRAMMED PRODUCT FOR UNIQUELY IDENTIFYING PARTICIPANTS IN A RECORDED STREAMING TELECONFERENCE" and filed on Feb. 15, 2022), the contents of which are hereby incorporated by reference in their entirety.

For example, as discussed in U.S. application Ser. No. 17/651,204, titled "METHOD FOR UNIQUELY IDENTIFYING PARTICIPANTS IN A RECORDED STREAMING TELECONFERENCE", such diarized transcript of a conversation may be created through a method of uniquely identifying one or more respective participants among a plurality of participants in a first recorded teleconference, the method involving (a) obtaining, by a computer system, components of the first recorded teleconference among the plurality of participants conducted over a network, the components including: (1) an audio component including utterances of respective participants that spoke during the first recorded teleconference, (2) a video component including a video feed as to respective participants that spoke during the first recorded teleconference, (3) teleconference metadata associated with the first recorded teleconference and including a first plurality of timestamp information and respective speaker identification information associated with each respective timestamp information, (4) transcription data associated with the first recorded teleconference, the transcription data being indexed by timestamps, (b) parsing, by the computer system, the audio component into a plurality of speech segments in which one or more participants were speaking during the first recorded teleconference, each respective speech segment being associated with a respective time segment including a start timestamp indicating a first time in the telephone conference when the respective speech segment begins, and a stop timestamp associated with a second time in the telephone conference when the respective speech segment ends, (c) tagging, by the computer system, each respective speech segment with the respective speaker identification information based on the teleconference metadata associated with the respective time segment, and (d) diarizing the first recorded teleconference, by the computer system, in a process including: (1) indexing, by the computer system, the transcription data in accordance with respective speech segments and the respective speaker identification information to generate a segmented transcription data set for the first recorded teleconference, (2) identifying, by the computer system, respective speaker information associated with respective speech segments using a neural network with at least a portion of the segmented transcription data set determined according to the indexing as an input, and a source indication as an output and a training set including transcripts or portions of transcripts tagged with source indication information, and (3) labeling, by the computer system, each respective speech segment based on the identified respective speaker information associated with the respective speech segment. Additionally, according to this application, such diarized transcript of a conversation may be created through a method of uniquely identifying one or more respective participants among a plurality of participants in a first recorded teleconference, the method including: (a) obtaining, by a computer system, components of the first recorded teleconference among the plurality of participants conducted over a network, the components including: (1) an audio component including utterances of respective participants that spoke during the first recorded teleconference, (2) a video component including a video feed as to respective participants that spoke during the first recorded teleconference, (3) teleconference metadata associated with the first recorded teleconference and including a first plurality of timestamp information and respective speaker identification information associated with each respective timestamp information, (4) transcription data associated with the first recorded teleconference, wherein said transcription data is indexed by timestamps, (b) parsing, by the computer system, the audio component into a plurality of speech segments in which one or more participants were speaking during the first recorded teleconference, each respective speech segment being associated with a respective time segment including a start timestamp indicating a first time in the telephone conference when the respective speech segment begins, and a stop timestamp associated with a second time in the telephone conference when the respective speech segment ends, (c) tagging, by the computer system, each respective speech segment with the respective speaker identification information based on the teleconference metadata associated with the respective time segment, and (d) diarizing the first recorded teleconference, by the computer system, in a process including: (1) indexing, by the computer system, the transcription data in accordance with respective speech segments and the respective speaker identification information to generate a segmented transcription data set for the first recorded teleconference, (2) identifying, by the computer system, respective speaker information associated with respective speech segments by: (a) searching through text in at least a portion of the segmented transcription data set determined according to the indexing, so as to determine a set of one or more commonly uttered expressions, (b) determining a source indication based on the set of commonly uttered expressions based on a mapping between the commonly uttered expressions and one or more roles, and (c) identifying the respective speaker information associated with respective speech segments based on the source indication, and (3) labeling, by the computer system, each respective speech segment based on the identified respective speaker information associated with the respective speech segment.

As a further example, as discussed in U.S. application Ser. No. 17/651,208, titled "SYSTEM, METHOD AND PROGRAMMED PRODUCT FOR UNIQUELY IDENTIFYING PARTICIPANTS IN A RECORDED STREAMING TELECONFERENCE", such diarized transcript of a conversation may be created through a method of using visual information in a video stream of a first recorded teleconference among a plurality of participants to diarize speech, the method involving: (a) obtaining, by a computer system, components of the first recorded teleconference among the plurality of participants conducted over a network, the respective components including: (1) an audio component including utterances of respective participants that spoke during the first recorded teleconference; (2) a video component including a video feed as to respective participants that spoke during the first recorded teleconference; (3) teleconference metadata associated with the first recorded teleconference and including a first plurality of timestamp information and respective speaker identification information associated with each respective timestamp information; (4) transcription data associated with the first recorded teleconference, the transcription data being indexed by timestamps; (b) parsing, by the computer system, the audio component into a plurality of speech segments in which one or more participants were speaking during the first recorded teleconference, each respective speech segment being associated with a respective time segment including a start timestamp indicating a first time in the first recorded telephone conference when the respective speech segment begins, and a stop timestamp associated with a second time in the first recorded telephone conference when the respective speech segment ends; (c) tagging, by the computer system, each respective speech segment with the respective speaker identification information based on the teleconference metadata associated with the respective time segment; and (d) diarizing the first recorded teleconference, by the computer system, in a process involving: (1) indexing, by the computer system, the transcription data in accordance with respective speech segments and the respective speaker identification information to generate a segmented transcription data set for the first recorded teleconference; (2) identifying, by the computer system, respective speaker information associated with respective speech segments using a neural network with at least a portion of the video feed corresponding in time to at least a portion of the segmented transcription data set determined according to the indexing as an input, and providing source indication information for each respective speech segment as an output and using a training set including visual content tagged with prior source indication information; and (3) labeling, by the computer system, each respective speech segment based on the identified respective speaker information associated with the respective speech segment wherein the identified respective speaker information is based on the source identification information. Additionally, according to this application, such diarized transcript of a conversation may be created through a method of using video content of a video stream of a first recorded teleconference among a plurality of participants to diarize speech, the method involving: (a) obtaining, by a computer system, components of the first recorded teleconference among the plurality of participants conducted over a network, the respective components including: (1) an audio component including utterances of respective participants that spoke during the first recorded teleconference; (2) a video component including a video feed including video of respective participants that spoke during the first recorded teleconference; (3) teleconference metadata associated with the first recorded teleconference and including a first plurality of timestamp information and respective speaker identification information associated with each respective timestamp information; (4) transcription data associated with the first recorded teleconference, the transcription data being indexed by timestamps; (b) parsing, by the computer system, the audio component into a plurality of speech segments in which one or more participants were speaking during the first recorded teleconference, each respective speech segment being associated with a respective time segment including a start timestamp indicating a first time in the first recorded telephone conference when the respective speech segment begins, and a stop timestamp associated with a second time in the first recorded telephone conference when the respective speech segment ends; (c) tagging, by the computer system, each respective speech segment with the respective speaker identification information based on the teleconference metadata associated with the respective time segment; and (d) diarizing the first recorded teleconference, by the computer system, in a process involving: (1) indexing, by the computer system, the transcription data in accordance with respective speech segments and the respective speaker identification information to generate a segmented transcription data set for the first recorded teleconference; (2) identifying, by the computer system, respective speaker information associated with respective speech segments using a neural network with at least a portion of the video feed including video of at least one participant among the respective participants corresponding in time to at least a portion of the segmented transcription data set determined according to the indexing as an input, and a source indication as an output and a training set including a plurality of videos of persons tagged with indications of whether the respective persons are speaking; and (3) labeling, by the computer system, each respective speech segment based on the identified respective speaker information associated with the respective speech segment. Moreover, according to this application, such diarized transcript of a conversation may further be created through a method of using video content of a video stream of a first recorded teleconference among a plurality of participants to diarize speech, the method involving: (a) obtaining, by a computer system, components of the first recorded teleconference among the plurality of participants conducted over a network, the respective components including: (1) an audio component including utterances of respective participants that spoke during the first recorded teleconference; (2) a video component including a video feed including video of respective participants that spoke during the first recorded teleconference; (3) teleconference metadata associated with the first recorded teleconference and including a first plurality of timestamp information and respective speaker identification information associated with each respective timestamp information; (4) transcription data associated with the first recorded teleconference, said transcription data being indexed by timestamps; (b) parsing, by the computer system, the audio component into a plurality of speech segments in which one or more participants were speaking during the first recorded teleconference, each respective speech segment being associated with a respective time segment including a start timestamp indicating a first time in the first recorded telephone conference when the respective speech segment begins, and a stop timestamp associated with a second time in the first recorded telephone conference when the respective speech segment ends; (c) tagging, by the computer system, each respective speech segment with the respective speaker identification information based on the teleconference metadata associated with the respective time segment; and (d) diarizing the first recorded teleconference, by the computer system, in a process involving: (1) indexing, by the computer system, the transcription data in accordance with respective speech segments and the respective speaker identification information to generate a segmented transcription data set for the first recorded teleconference; (2) identifying, by the computer system, respective spoken dialogue information associated with respective speech segments using a neural network with at least a portion of the video feed including video of at least one participant among the respective participants corresponding in time to at least a portion of the segmented transcription data set determined according to the indexing as an input, and spoken dialogue indication information as an output and a training set including a plurality of videos of persons tagged with indications of what spoken dialogue the respective persons are speaking; and (3) updating, by the computer system, the transcription data based on the identified respective spoken dialogue information associated with the respective speech segment. What's more, according to this application, such diarized transcript of a conversation may also be created through a method of using visual information in a video stream of a first recorded teleconference among a plurality of participants to diarize speech, the method involving: (a) obtaining, by a computer system, components of the first recorded teleconference among the plurality of participants conducted over a network, the respective components including: (1) an audio component including utterances of respective participants that spoke during the first recorded teleconference; (2) a video component including a video feed as to respective participants that spoke during the first recorded teleconference; (3) teleconference metadata associated with the first recorded teleconference and including a first plurality of timestamp information and respective speaker identification information associated with each respective timestamp information; (4) transcription data associated with the first recorded teleconference, the transcription data being indexed by timestamps; (b) parsing, by the computer system, the audio component into a plurality of speech segments in which one or more participants were speaking during the first recorded teleconference, each respective speech segment being associated with a respective time segment including a start timestamp indicating a first time in the first recorded telephone conference when the respective speech segment begins, and a stop timestamp associated with a second time in the first recorded telephone conference when the respective speech segment ends; (c) tagging, by the computer system, each respective speech segment with the respective speaker identification information based on the teleconference metadata associated with the respective time segment; and (d) diarizing the first recorded teleconference, by the computer system, in a process involving: (1) indexing, by the computer system, the transcription data in accordance with respective speech segments and the respective speaker identification information to generate a segmented transcription data set for the first recorded teleconference; (2) identifying, by the computer system, respective speaker information associated with respective speech segments by: (a) determining, in at least a portion of the video feed corresponding in time to at least a portion of the segmented transcription data set determined according to the indexing, a location of lips; (b) determining whether, at the determined location of lips in the least a portion of the video feed and based on comparison of two or more images separated in time, the lips are moving; (c) determining a source indication based on whether the lips are moving; and (d) identifying the respective speaker information associated with respective speech segments based on the source indication; and (3) labeling, by the computer system, each respective speech segment based on the identified respective speaker information associated with the respective speech segment.

In embodiments of the present invention, transcripts may be summarized according to the systems and methods herein discussed, and for example employing diarized transcript analysis and review system 100.

A data stream or transmission to one or more of user devices 103-1, 103-2, 103-3, 103-4 may be provided by server 101 over network 102 including summary information pertaining to diarized teleconferences. The data stream may further include other content, such as transcript or audio or video stream, containing audio or visual recordings of the transcript participants. Such other content nay be indexed so as to be accessible according to links contained within the summary information, so as to be selectably accessed by a user of a user device 103-1, 103-2, 103-3, 103-4, for example by providing the entirety or relevant portions of the content to storage associated with the user devices 103-1, 103-2, 103-3, 103-4, or enabling the user devices 103-1, 103-2, 103-3, 103-4 to stream the content from the server or servers 101 over the network 102 (e.g. when a link is clicked on). Server 101 may receive the summary information and content from the conversations on-line in real time, or it may, additionally or alternatively, receive recordings made and stored by other means.

Server 101 includes a processor or group of processors, such as a general-purpose computer processor or processors, which is connected to the network 102 by a network interface. In embodiments, server 101 receives (e.g., from an outside source or by itself generating), a corpus of diarized transcripts of conversations (and, in certain embodiments, other audio and/or visual content) in memory operatively connected thereto, for processing by the processor(s). The processor(s) autonomously creates summary information pertaining to the diarized transcripts of conversations. At the conclusion of this process, the processor(s) may present the summary information on a display or through another output, which display or other output may for example be on or associated with a user device 103 or on or associated with a different computer or device.

The processor(s) typically carries out the functions that are described herein under the control of program instructions in software. This software may be downloaded to server 101 in electronic form, for example over a network such as network 102. Additionally or alternatively, the software may be provided and/or stored on tangible, non-transitory computer-readable media, such as optical, magnetic, or electronic memory media operatively connected to the server 101.

Data Flow Overview

Figure 2:
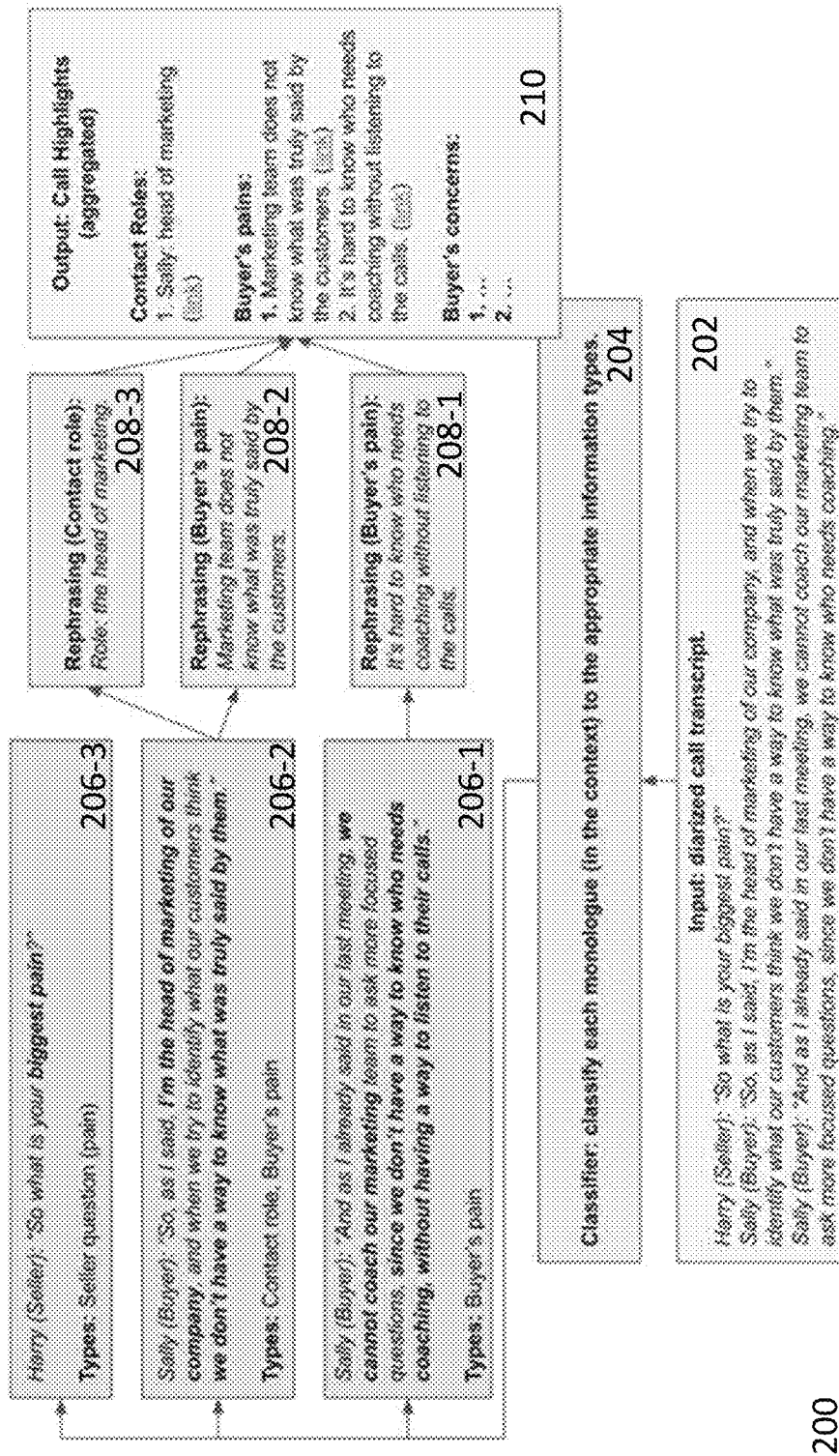
FIG. 2 is a data flow chart that schematically illustrates a flow of data usable for automatic analysis of a call transcript to generate and output aggregated call highlights, in accordance with embodiments of the present invention.

FIG. 2 is a data flow chart that schematically illustrates a flow of data 200 usable for automatic analysis of a call transcript 202 to generate and output aggregated call highlights 210, in accordance with embodiments of the present invention.

In embodiments of the present invention, a diarized call transcript 202 may be input, for example at the server 101. In embodiments, the inputted call transcript 202 may be pre-prepared, or it may be generated by the system 100 or server 101 from actual conversation, as discussed for example in connection with U.S. application Ser. Nos. 17/651,204 and 17/651,208, discussed above.

In embodiments, the call transcript 202 may be a diarized call transcript. For example, in embodiments, the transcript may be made up of a plurality of monologues having an associated speaker and/or speaker role. As shown for example in FIG. 2, the monologues may be associated with a name of a speaker (e.g, as shown, "Harry" and "Sally") and/or a role (e.g., as shown "Seller" or "Buyer", or in other situations, for example those pertaining to human resources or product development, other situationally relevant roles may be used, such as identified above, to name a few). In embodiments, other speaker identifications may be employed, enabling association of particular monologues or sets of monologues, including monologues separated in conversational order from each other, with a particular speaker. In embodiments, several monologues may be associated with a single speaker. In embodiments, monologues may be made up of the entire length of spoken text uttered by a speaker without interruption or pause, or may be broken down into small components, for example, sentences or predefined lengths of speech (e.g. a predefined number of words or letters or syllables).

In embodiments, monologues may be associated, or further associated, with a side of the conversation, for example "Seller" or "Buyer" side. For example, in embodiments it may be determined, for example via a CRM system, that multiple speakers having different names—e.g. "Joe" in addition to "Sally"—are associated with the buyer (or seller) side, and each may accordingly be indicated as a "Buyer" (or "Seller", or such other contextually-relevant role as is used).

Classification

In embodiments, a classifier 204 may be applied to one or more or all of the monologues, so as to identify relevant types or classifications 206-1, 206-2, 206-3 and/or associated content. In embodiments, the classifier may be one or more neural networks trained according to a training set associating monologues, with associated types or classifications and/or particularly relevant textual content of such monologues (shown in bold in FIG. 2). In embodiments, a single neural network may be used to identify plural types or classifications, while in other embodiments, multiple neural networks may be used each specially trained to identify a subset of possible types or classifications (e.g., one or two types or classifications). In embodiments, algorithmic approaches for identification of types or classifications and/or particularly relevant textual content may be used. In embodiments, types or classifications may include buyer's pain, buyer's concern, objection, potential objection, action item, contact role, role of a person, responsibility of a person, seller's question (e.g, with a subtype such as pain), or a coaching opportunity (e.g. for a seller-side speaker), to name a few. For example in an HR or product development context, classifications might include for example "management concern", "compensation issue", "harassment concern", "reasonable accommodation", "software bug", "development timeline", "optimization needed", to name a few.

In embodiments, the classifier 204 may be implemented using natural language processing methodology. In embodiments the classifier 204 may be a set of classifiers, and may classify one or more or all monologues according to the relevant types or classifications of interest that may be of interest and that may be included in the types or classifications 206-1, 206-2, 206-3. In embodiments, each monologue may be classified with zero, one, two, three, or more types or classifications. For example, types or classifications 206-1 and 206-3 each contain one type or classification, while type or classification 206-2 contains two types or classifications (and thus may be a multi-label classification). While not shown in FIG. 2, in embodiments, zero types or classifications may be applied to a monologue for example where the classifier 204 identifies no relevant information in the monologue (e.g., where the monologue is a mere interjection such as "uh", or where monologue contains only information lacking relevance in the particular context, such as "the weather sure is nice today" during a sales call).

Contextual information may be analyzed by the classifier 204 in determining the types or classifications. For example, where a monologue by a first speaker refers to an email desired by that first speaker, and where a later monologue of a second speaker recites "I will send it to you", the classifier 204 may determine that the later monologue is or includes a type or classification of an action item with relevant text referencing the email.

Rephrasing

In embodiments, rephrasings 208-1, 208-2, 208-3 may then be created, for example from the types or classifications 206-1, 206-2, 206-3 and the associated textual content or monologues. In embodiments, one or more or all of the monologues may be rephrased. In embodiments, the rephrasing may be in the form of a short, fluent and/or self-contained sentence or item of information, or in the form of a short, fluent and/or self-contained group of a plurality of sentences (e.g., 2, 3, 4, 5 or more sentences) or items of information (e.g., 2, 3, 4, 5, or more items of information). In embodiments, the rephrasings 208-1, 208-2, 208-3 may include important information regarding each of the types or info-types or classifications associated with the monologues.

In embodiments, the rephrasing 208-1, 208-2, 208-3 may be associated with, and may be performed for, each type or classification 206-1, 206-2, 206-3 or each associated label thereof. For example, type or classification 206-2 contains two labeled types or classifications, contact role and buyer's pain. Accordingly, in embodiments, rephrasings 208-2 and 208-3 may be created, regarding buyer's pain and contact role (e.g., along with the associated monologue), respectively. As an additional example, type or classification 206-1 has a single label, buyer's pain, and rephrasing 208-1 is regarding such buyer's pain and the associated monologue.

In embodiments, the rephrasing may be performed by an algorithm (e.g. a single algorithm operating on the server 101) that receives the monologue and type or classification or info-type as inputs, and outputs the rephrasing (e.g. along with the associated respective type or classification or info-type). In embodiments, different algorithms may be selectively employed depending on the associated type or classification or info-type, thereby allowing use of specialized algorithms for different types or classifications or info-types, which may advantageously allow for improved execution speed or processing or memory consumption, or improved output quality. A nested algorithmic structure may be used, where a first algorithm determines the appropriate type or classification or info-type, and selectively calls one of a second set of algorithms based thereon.

In embodiments, algorithms employed to accomplish rephrasing may be in the form of a neural network or set of neural networks trained with training data associating textual content with rephrasings.

In embodiments, algorithms (e.g. neural-network-based or non-neural-network-based algorithms) employed for rephrasing may be selected amongst, a seq2seq recurrent neural network, a long short-term memory network, a transformer-based model, (e.g. GPT-3, GPT-J, T5) a bidirectional and auto-regressive transformer architecture, an encoder-decoder transformer-based architecture, and template filling, to name a few.

In embodiments, rephrasing may be performed by or involve the use of a pre-trained model, such as GPT-3, Jurassic, GPT-J, BART, T5, or GPT-NEO, to name a few. In embodiments, the pre-training of such models may involve providing the models with a large corpus of data (e.g., as with GPT-3 training). In embodiments, beyond the pre-trained model, no further training may be performed. In embodiments, the pre-trained model may process input text into a condensed or continued version thereof, and thereby create a rephrasing.

In embodiments, the quality of the rephrasings created by the model may be improved, for example towards a target quality, through a reinforcement learning approach. In an embodiment, the reinforcement learning approach may be a human feedback-based reinforcement learning approach, such as is discussed by Paul Christiano et al. in connection with discussions on Open AI of learning to summarize with human feedback.

In embodiments, rephrasing may be performed according to a prompt-generation process. In embodiments, the model may be provided with one or more samples (e.g. of monologues associated with contextually-appropriate summarizations thereof), so as to train the model regarding rephrasing. In embodiments, the number of samples may be selected consistent with a zero-shot, one-shot, or few-shot learning approach. In embodiments, the model may further be provided, e.g. as an input, with a sentence or other expression describing the rephrasing task or particular rephrasing task.

Such approach may be further understood with respect to the extraction of shortened, contextually useful data as may be associated with a particular classification or label, from a monologue. For example, it may desired to extract a contact role and responsibilities from a speaker's monologue. By way of sample explanation and understanding, the monologue may be "And I'm the head of marketing at Darting-Corp. I'm responsible for defining the marketing strategy of the entire company, and I'm managing 3 different channels. The US channel, the EU channel and the Asia channel." For such monologue, a sample prompt with associated training data as shown in FIG. 11 may be provided to the model.

It can be seen in such prompt that both a description of the rephrasing task is provided (towards the top of FIG. 11) as well as several samples consistent with a few-shot training approach. Each sample may be associated with summarized language (or a lack of any summarized language) for each label or classification to be provided for such monologue text under the model.

In embodiments of the present invention, the monologue from the conversation under consideration may be concatenated to the prompt, for example as shown in this example particularly towards the bottom of FIG. 12.

In embodiments of the present invention, the model may be allowed to continue the conversation, based on the training data provided, and may thereby create output, for example as seen in FIG. 13. Such output may be indicative of rephrasings associated with zero, one or plural types, classifications or categories. In this case of the output shown in FIG. 13, rephrasings are shown associated with two ("Role" and "Responsibilities").

In embodiments, rephrasing may be accomplished according to models trained or specifically trained for the summarization task. In embodiments, the model may be specifically trained for each or certain classifications, labels, or categories. For example, in embodiments, a first model may be trained with respect to summarization of buyer's pains, a second model may be trained with respect to summarization of contact roles, a third model may be trained with respect to summarization of a speaker's responsibilities, to name a few. Models may also be trained with respect to each or certain classifications, labels or categories relevant to other contexts, such as human resources or product development.

In embodiments, a model may be trained with respect to both identification of an entity or classification, and with respect to rephrasing. In embodiments, the training data may include monologues associated with both zero or one or more associated entities or classifications and with a summarization of the monologue. An example training set according to such embodiments is shown in FIG. 5. In embodiments, as shown in bold in connection with certain of these monologues, key information associated with the monologue may likewise be provided. As also shown in FIG. 5, with particular reference to the bold text, the same monologue may be associated with multiple entities or classifications, and with multiple rephrasings. Accordingly, in embodiments a single trained neural network or other model may be used for classification and for rephrasing, and, in embodiments, may determine multiple categorized rephrasings for a single monologue. In embodiments, the combined output of such neural network or model for multiple monologues of the conversation of the diarized transcript under evaluation may be evaluated for clustering, as discussed herein. In embodiments, such models may be or include a multi-head model. In embodiments, in the multi-head model, a plurality of the heads or each of the heads outputs a summarization regarding a single entity, for example, one output summarization for contact role, one output summarization for summarization for pain, and/or one output summarization for pricing objections, to name a few. In embodiments, where no entity data is associated with a monologue, the output summarization or target may be empty, while where for the monologue is associated with entity data, the output may be the summarization as relevant to, or prepared according to the needs of, the associated entity.

In embodiments in which separate models are used for each entity or classification or category, only rows of the training data associated with such category may be used as training by the specialized model. In embodiments employing a single model across entities or classifications or categories, data in the table applying to all or multiple of such entities or classifications or categories may be employed as training for such model. In embodiments, in the separate model approach, a separate classification model applied to the monologue may be used to select the appropriate entity or classification and thus the appropriate model. In embodiments, with the single model approach, the single model may itself be used for this determination of entity or classification associated with a particular monologue.

Figure 4:
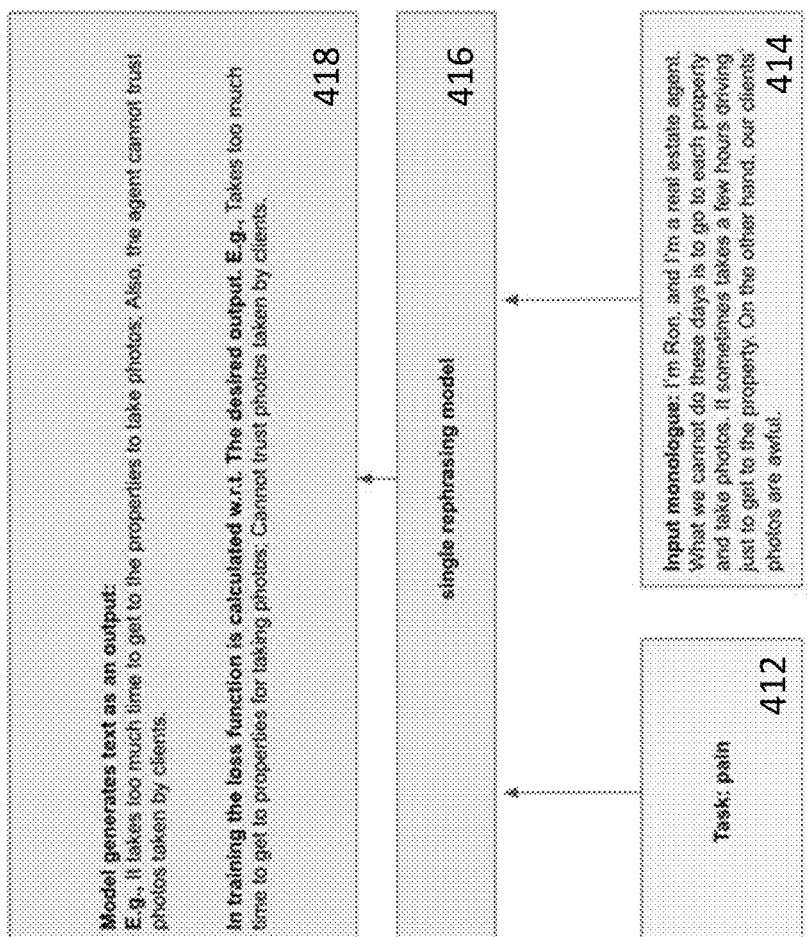
FIG. 4 is a flow chart that schematically illustrates a method for automatic rephrasing of a textual monologue, based on the monologue and an associated classification, in accordance with embodiments of the present invention.

The data flow involved with the use of such training data as shown in FIG. 5, may be seen more clearly in FIG. 4, demonstrating such data flow 400. As seen in FIG. 4, a rephrasing model 416 (e.g., one trained with such training data as is shown in FIG. 5 and discussed in connection therewith) may be provided with an input monologue 414. The rephrasing model 416 may further be provided with (or may itself determine as discussed above) a task or entity of classification 412. Thereby, rephrased text associated with the monologue, for example as discussed herein, may be generated as an output 418.

In embodiments, and as shown at 418 of FIG. 5, the model or models may further be trained according to a loss function. For example, where rephrasings are determined to be well-done (e.g. manually or by a user of a user device 103-1, 103-2, 103-3, 103-4 rating the quality of the rephrasings, e.g. on a one to five star basis) increases of the weights used in the particular rephrasing may occur. Conversely, where rephrasings are determined to be poorly-done (e.g. manually or by a user of a user device 103-1, 103-2, 103-3, 103-4 rating the quality of the rephrasings, e.g. on a one to five star basis) decreases of the weights used in the particular rephrasing may occur.

Aggregation

In embodiments, rephrasings 208-1, 208-2, 208-3 may be, e.g. by the server(s) 101 of the system 100, aggregated into a call highlights or call output or summary information 210.

In embodiments, the aggregation can occur by concatenating rephrasings pertaining to each type or classification into a category, and for example including same under a corresponding categorical header (e.g., as shown, "Contact Roles:", "Buyer's pains:", "Buyer's concerns:", to name a few, or other categorical headers as correspond to other contexts such as human resources and sales).

In embodiments, a clustering algorithm may be employed to cluster similar monologues or similar rephrasings to the same cluster. Monologues or rephrasings within such a same cluster may be considered together in creating a single corresponding rephrasing for the cluster, for inclusion in the call highlights or call output or summary information 210, thereby advantageously reducing redundancy within a category.

In embodiments, the clustering algorithm may be implemented by representing each monologue as a numerical vector. In embodiments, the content of such vectors may be supplied, as part of the clustering algorithm, a clustering method, such as agglomerative or hierarchical clustering, K-means clustering, density-based spatial clustering of applications with or without notice, hierarchical density-based spatial clustering of applications with or without notice, to name a few. In embodiments, this may be implemented as a single vector across all classifications, types, entities or categories. In embodiments, a different vector may be used relating to each classification, type, entity or category, and, in embodiments, the same or different clustering methods may be used for different vectors. For example, in embodiments, contact-role vectors may be aggregated using a first clustering method (e.g., from those discussed above) over the contact-role vector representations of the monologues, while customer-pain vectors may be aggregated using a second clustering method (e.g., from those discussed above) over the customer-pain vector representations of the monologues. In other contexts, vectors may correspond to information of particular relevance to other contexts, such as human resources or product development.

In embodiments, identical vector representations pertaining to a particular type, entity, or category would be considered as having the same cluster identification and thus to be part of the same cluster for the purposes discussed herein.

In embodiments, a summarization algorithm may be employed to combine or reduce the number of a set of rephrasings associated with the same cluster. In embodiments, the summarization algorithm may choose a rephrasing from amongst the set of clustered rephrasings for use, or may combine rephrasings within a cluster to a single or a smaller number of rephrasings. The summarization algorithm may employ natural language processing for this task.

In embodiments, some or all of the sentences or monologues of one or more or all of the entities in the conversation may be aggregated and rephrased. In embodiments, this may be performed by a network or neural network trained for this purpose, or by another architecture such as is discussed herein. For example, according to an embodiment of the invention, output summaries (e.g. pertaining to a contact role) from multiple monologues, such as are shown below, may be aggregated and rephrased as also shown thereafter:

Sample Output Summaries
    Ron Cohen: Role: VP sales; Responsibilities: (blank)
    Ron Cohen: Role: (blank); Responsibilities: increase the win-rate of the teams.
    Josh Wallaby: Role: CEO assistant; Responsibilities: schedule the meetings for the CEO.
    Ron Cohen: Role: (blank); Responsibilities: Focus on the EMEA sales in the coming year.

Sample Aggregation and Rephrasing
    Ron Cohen: Role: VP sales; Responsibilities: increase win-rate of the sales teams, focusing on the EMEA in the coming year.
    Josh Wallaby: Role: CEO assistant; Responsibilities: schedule the meetings for the CEO.

In embodiments, the ordering of rephrasings in the call highlights or call output or summary information 210 may be determined according to a scoring or ranking score, which may for example be indicative of the importance of a rephrasing. In embodiments, a scoring or weighting algorithm may determine a score for a rephrasing. This score may be determined based on, and may increase along with, a number of times that an issue was mentioned, which may be determined based on the size of a determined cluster of similar rephrasings or monologues. In embodiments, the score may alternatively or further be based on other factors. In embodiments, such factors may include a duration (e.g. in terms of number of words or syllables or associated time) spent by a speaker (e.g. a buyer or seller) in connection with the similar monologues or associated the topic, the use of specific terminology associated with importance (e.g. "our biggest pain" in the phrase "this is our biggest pain today", or "important" or "important to us", to name a few).

Ranking according to score advantageously addresses the issue of many rephrasings potentially appearing within a category (e.g. "Buyer's pains:"), with rephrasings of lower priority, in the absence of ranking, potentially obscuring or making harder to review rephrasings of higher importance. For example, a buyer may have a large number of pain-items, such as an inability to record calls, and an inability to verify their agents asking for recording consent at the beginning of a call, to name a few. Such items of particular importance to a particular sales context may be detected through natural language-processing or heuristic methods (e.g., including searching for associated keywords such as "record" or "consent"), and applying a high score to such known important content. Scores may be applied to rephrasings or associated monologue content based on appearance of terms relating to emphasis (e.g. "biggest" tending to increase score, while "less important" tending to decrease score, to name a few). In embodiments, a large number of times and/or duration associated with particular language or clustered content may also or alternatively increase score, for example proportionally to the number of mentions or the duration. In embodiments, score may also or alternatively be increased according to review of transcript data from other calls or conversations, for example, increasing the score of particular language or clustered content frequently mentioned or frequently referred to as important by a customer-at-issue or other customers during other calls or conversations.

In embodiments, ranking may be accomplished, for example by the server(s) 101 of the system 100, according to a two-step process.

In embodiments, first, given a monologue known to be related to an entity or classification, a 'sentiment-analysis' or similar model may be employed that searches for phrases indicative of importance. For example, a phrase such as "We cannot record calls today, and this is our biggest problem," denoting a high degree of importance, (for example due to the presence of strong wording "cannot" and "biggest") may be given a higher ranking_score_base, as compared to "We also want to verify that our agents ask for consent in the beginning" (for example due to weaker or more neutral language such as "also"). In embodiments, this may be calculated in a rephrase_monologues method.

In embodiments, second, aggregating all monologues talking about a specific item (e.g., having a same clustering as discussed herein), a duration may be calculated that a speaker (e.g. a buyer) discussed such item, with higher scores being given according to higher durations. In embodiments, this may be calculated in an aggregate_summaries method.

Thus, for example, where each monologue is assumed for purposes of easier understanding to consist of a single item, and in keeping with the above discussion, example pseudocode as shown in FIG. 7 may be used for the scoring process.

In embodiments, a local_ranking_model[entity] may operate according to one or more models that, based on a textual input, provide an importance score based on presence of phrases indicating importance and urgency (for example as discussed above). In embodiments, the same model as used for summarization may provide the score as another output. Accordingly, and in keeping with the above discussion, example pseudocode as shown in FIG. 8 may be used for this process.

In embodiments, the score may also be based on the duration or extent of wording spent on a specific item (for example, as associated with a clustering as discussed herein). In embodiments, the clustering and/or aggregation processes as discussed herein may be employed so as to include all of the relevant discussion associated with such item. For example, if, during a call, a buyer states, at different portions of the call, that "so, our biggest pain is that we're not able to record calls" in a first monologue and "and we really want to go over calls afterwards, so being able to record them would be great" in a second monologue, then they may be clustered together with respect to this particular buyer pain, and durations associated with each monologue may be added or otherwise combined together for purposes of the score determination for a combined rephrasing based on both.

Accordingly, and in keeping with the above discussion, example pseudocode as shown in FIG. 9 may be used for this process. While this pseudocode assumes that each monologue is provided with a single label or classification, the general approach, in embodiments, may be employed where monologues may be associated with not just a single, but also zero or plural labels or classifications.

In keeping with the above discussion, in embodiments, sample pseudocode implementing aggregate_scores is shown in FIG. 10.

Scoring of a monologue may also take into account contextual information such as timing of the monologue within a conversation and reference to other monologues. For example, as discussed herein, referential relationships between monologues can be used to determine related statement content, and thus may be used to determine clustering, which is a factor in scoring. Also, the relative location within a conversation of a monologue can be used for adjusting the score of a monologue. For example, statements closer to the middle of a conversation may be assumed to be more important than statements closer to the beginning or end of the conversation, (which may be assumed for example to be mostly small-talk or next-steps discussion) and thus such statements may have a upwards-adjusted score (or conversely those towards the beginning or end may have a downwards adjusted score.

Call Highlights or Summary Information

In embodiments, the call highlights or call output or summary information 210 may include links (e.g. hyperlinks) to the associated portion of the transcript, or to the associated portion of a recorded audio or audio-video call or conversation recording associated with such portion of the transcript. In embodiments, the link may provide an opportunity for the viewer to view, for example together or serially, multiple transcript or audio or video portions associated with a cluster associated with the rephrasing displayed in the call highlights or call output or summary information 210. Thereby, advantageously, a reviewer may be able to, with minimal input, review both a condensed and complete version of the relevant portion or portions of the conversation. In addition to a link, such transcript or audio or video portion(s) may be made available through other interfaces, such as made available upon mouseover or other selection of the rephrasing within the summary information 210.

Advantageously, the call highlights or summary information 210, 310 may be used for a variety of purposes. For example, in embodiments, it may be automatically or semi-automatically inserted into a customer relationship management system, for example by an automated script or application programming interface, thereby allowing for ready access to key information from calls, for example when reviewing calendar entries or invites associated with such calls. In embodiments, it may shorten the time required for front-line managers to prepare for meetings with account executives that they may supervise. In embodiments, it may shorten the time required for various involved individuals (e.g. front-line managers, heads of security, marketing managers, research and development managers, to name a few, or those who must perform review in other contexts such as human resources or product development) to understand what occurred in previous calls or sales calls that they may not have attended, advantageously preparing such individuals for future meetings. In embodiments, it may allow for such individuals to still obtain important information even other review is limited, e.g., when they merely listen to a recording at double-speed, for example by reinforcing key points in such reviewed conversations and allowing for rereview, as necessary, of important linked call or transcript content. In embodiments, it may be integrated into search functionality, such as functionality within CRM systems, so as to enable searching for or within calls involving particular entities. In embodiments, it may be used to generate visual or other summarizations of statistics pertaining to topics and duration of topics involved in calls or conversations. In embodiments, it may be used generate visual or other summarization of statistics associated such topics and duration of topics with success of the call, for example measured in terms of sales conversion. In embodiments, such information may be used for predictive modeling, for example to predict the likelihood of sales conversion (or other positive outcome such as, in other contexts, employee dispute resolution or successful feature implementation) based on a particular conversation or call. In embodiments, such information pertaining to association of topics and duration of topics with success may be used to provide suggestions, for example to an account executive or front line manager of suggested topics and/or topic durations for a particular current or future conversation or deal, or for general use when speaking to customers or other relevant individuals.

Additional Overview of Methods

Figure 3:
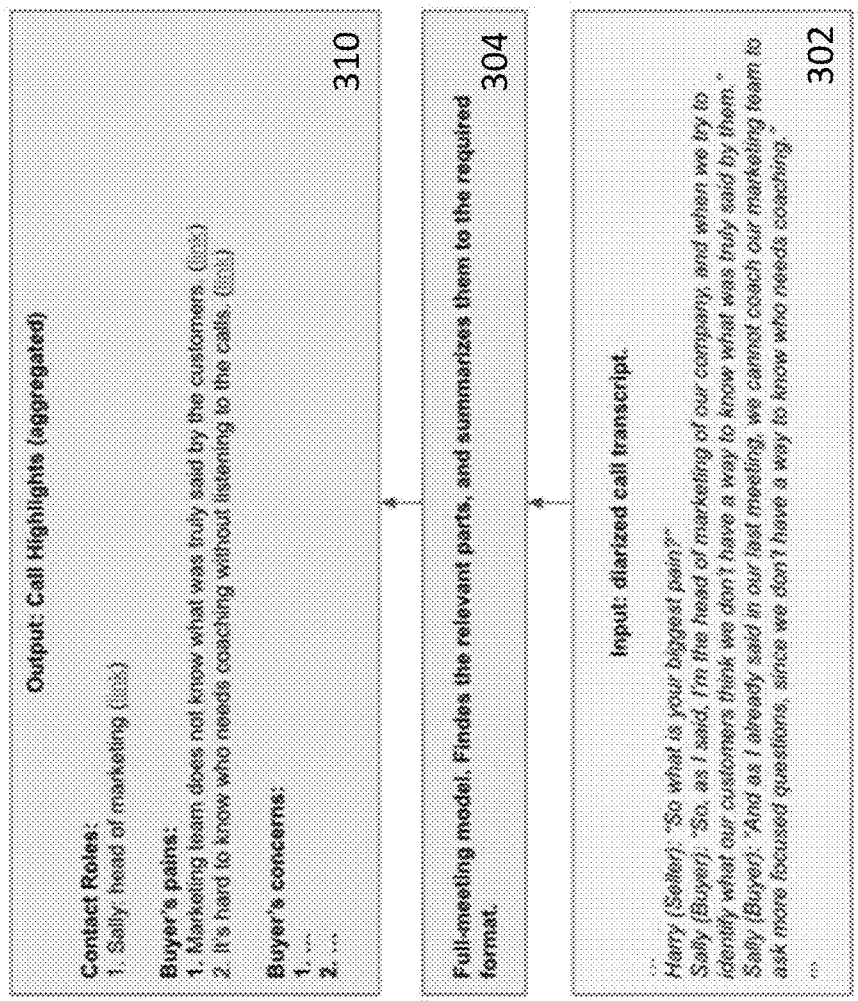
FIG. 3 is a flow chart that schematically illustrates a further method for automatic analysis of a call transcript to generate and output aggregated call highlights, in accordance with embodiments of the present invention.

FIG. 3 is a flow chart that schematically illustrates a further method 300 for automatic analysis of a call transcript 302 to generate and output aggregated call highlights or summary information 310, in accordance with embodiments of the present invention. FIG. 3 may be largely understood with respect to the functionality discussed above in connection with FIG. 2.

As shown in FIG. 3, in embodiments, a full-meeting model 304 may be employed in connection with the method. Accordingly, in embodiments, rather than, for example, engaging in classification and rephrasing in connection with each monologue (as generally shown according to certain embodiments discussed in connection with FIG. 2), the full-meeting model 304 may locate parts of the transcript 302 of relevance (for example, in connection with the relevant context, such as a sales context or human resources or product development context). This may be accomplished, for example, generally according to the approaches discussed above in connection with the classifier 204, classifications 206-1, 206-2, 206-3 and associated textual content, discussed above in connection with FIG. 2, applying them to the transcript 302 rather than to pre-separated monologues thereof. The relevant portions of the transcript may undergo processing, for example by the processor(s) 101 of the system 100, as generally discussed above in connection with FIG. 2 as being applied to the monologues, in order to arrive at the call highlights or summary information 310.

Figure 14:
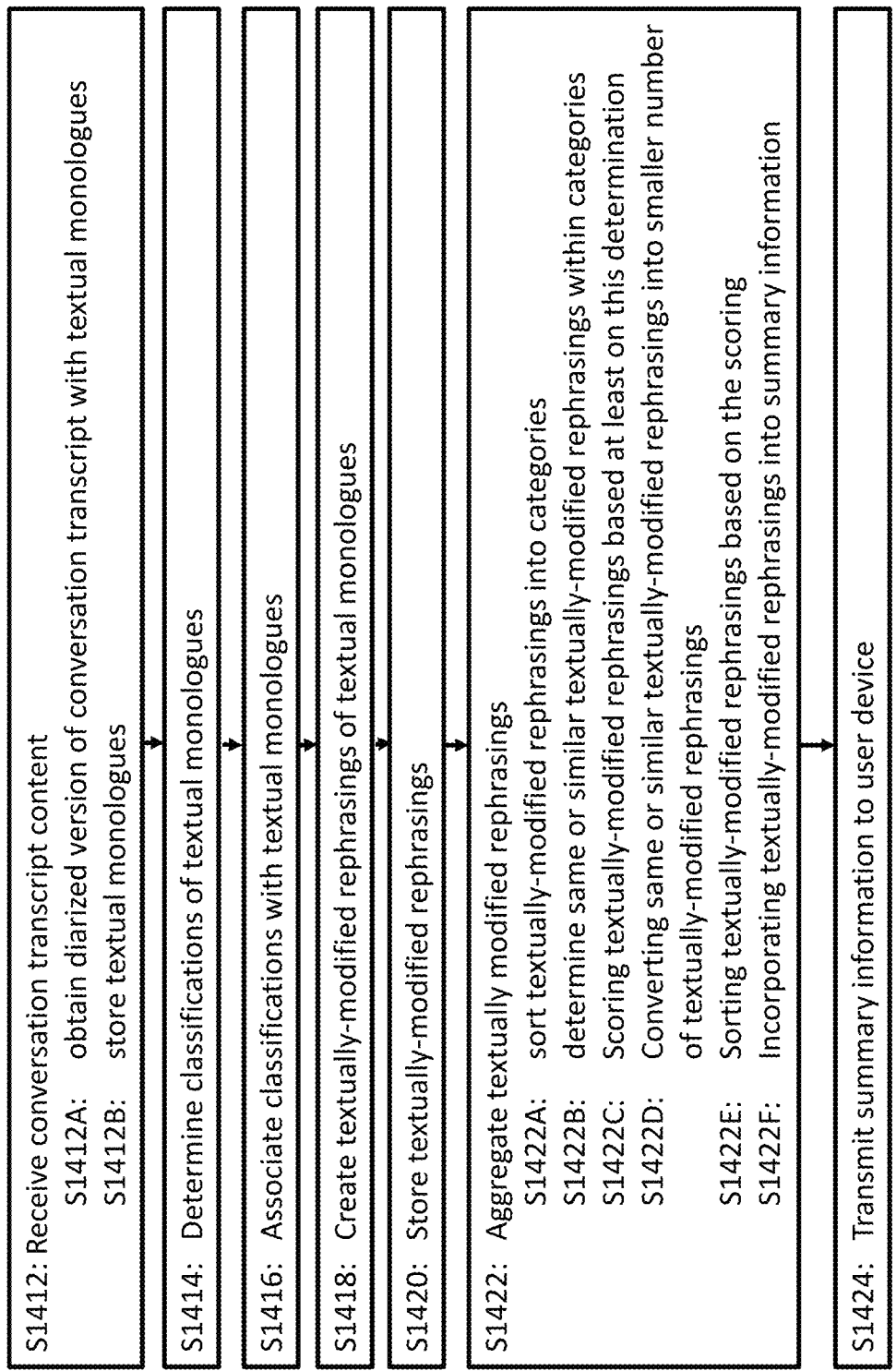
FIG. 14 is a flow chart that schematically illustrates a method for receiving, analyzing, and transmitting to a user device summary information pertaining to, a call transcript, in accordance with embodiments of the present invention.

FIG. 14 is a flow chart that schematically illustrates a method for receiving, analyzing, and transmitting to a user device summary information pertaining to, a call transcript, in accordance with embodiments of the present invention, which may be further understood with respect to the above disclosure.

In embodiments, first, at step S1412, a conversation transcript, such as a diarized transcript 202, 302 as discussed herein in connection with FIGS. 2-3, is obtained. In embodiments, this may involve, at Step 1412A, obtaining a diarized version of the conversation transcript containing textual monologues, and at Step 1412B, storing those textual monologues, for example in a memory associated with server(s) 101 of system 100.

In embodiments, then, at step S1414, classifications 206-1, 206-2, 206-3 of the textual monologues are determined. In embodiments, this may occur based on classifiers 204 as discussed above in connection with FIG. 2, and may be performed by the server(s) 101 of system 100.

In embodiments, then, at step S1416, the determined classifications may be associated with the textual monologues, for example within the memory associated with the server(s) 101 of system 100.

In embodiments, then, at step S1418, textually-modified rephrasings 208-1, 208-2, 208-3 of textual monologues may be created, for example as discussed herein including in connection with FIG. 2-4 and FIG. 12.

In embodiments, then, at step S1420, the textually-modified rephrasings may be stored, for example, in the memory associated with server(s) 101 of system 100.

In embodiments, then, at step S1422, the textually-modified rephrasings 208-1, 208-2, 208-3 may be aggregated into summary information 210.

In embodiments, this aggregation may involve, at step S1422A, sorting or otherwise associated the textually-modified rephrasings 208-1, 208-2, 208-3 into categories, for example categories according to entity or type or classification as discussed herein. In embodiments, this aggregation may involve, at step S1422B, determining same or similar textually-modified rephrasings within the categories, for example according to clustering and/or sharing the same cluster, as discussed herein.

In embodiments, the aggregation may involve, at step S1422C, textually-modified rephrasings 208-1, 208-2, 208-3 may be scored, for example based on this determination of same or similar textually-modified rephrasings, or based on such other scoring methodologies as are discussed herein. In embodiments, the aggregation may involve, at step S1422D, same or similar textually-modified rephrasings (e.g. rephrasings belonging to a common cluster or having a same cluster identification) may be converted into a smaller number of textually-modified rephrasings, for example as discussed herein.

In embodiments, the aggregation may involve, at step S1422E, sorting textually-modified rephrasings 208-1, 208-2, 208-3, for example within one or more or all categories, based on the scoring. Advantageously, this may allow for presentation of items of higher importance sooner or more prominently.

In embodiments, the aggregation may involve, at step S1422F, incorporating the textually-modified rephrasings 208-1, 208-2, 208-3 into call highlights or summary information 210, 310, as discussed for example in connection with FIG. 2 and FIG. 3

In embodiments, at step S1424, the call highlights or summary information 210, 310 may be transmitted, for example over network 102, to one or more user devices 103-1, 103-2, 103-3, 103-4, for example for display, output, printing, or other use thereon.

Sample pseudocode usable in connection with an implementation of such method, according to embodiments of the invention, is provided at FIG. 6.

In accordance with exemplary embodiments of the invention, there is a method for generating a categorized, ranked, condensed summary of a transcript, the method involving (a) receiving, by a computer system, an input of content from a transcript of a conversation, by (1) obtaining, by the computer system, a diarized version of the transcript of the conversation, the diarized version including (a) a first plurality of textual monologues of a first speaker in the conversation associated with an indication of the first speaker, and (b) a second plurality of textual monologues of a second speaker in the conversation associated with an indication of the second speaker, and (2) storing, by a processor of the computer system, at least the first plurality of textual monologues and the second plurality of textual monologues in one or more databases located in one or more memories operatively connected to the processor, (b) determining, by the processor, one or more classifications, from amongst a plurality of predetermined classifications, as to each textual monologue of the first plurality of textual monologues and as to each textual monologue of the second plurality of textual monologues, based on a classifier algorithm employing natural language processing, (c) associating, by the processor, within the one or more databases, each textual monologue of the first plurality of textual monologues and each textual monologue of the second plurality of textual monologues with the respective one or more classifications, (d) creating by the processor, textually-modified rephrasings, for one or more of the first plurality of textual monologues and for one or more of the second plurality of textual monologues, based on respective text of the textual monologue and at least one of the respective one or more classifications of the textual monologue, (e) storing, by the processor, the textually-modified rephrasings, in the one or more databases, (f) aggregating the textually-modified rephrasings by (1) sorting, by the processor, within the one or more databases, the textually-modified rephrasings into a plurality of categories based on the respective one or more classifications, (2) determining, by the processor, using a clustering algorithm, at least one clustering in the one or more databases of a plurality of same or similar textually-modified rephrasings within at least one the plurality of categories, (3) scoring, by the computer system, a plurality of textually-modified rephrasings in the one or more databases based at least on the at least one clustering, (4) converting, in the one or more databases, by the processor, a plural number of same or similar textually-modified rephrasings within at least one of the plurality of categories, into a counting number of textually-modified rephrasings, based on the at least one clustering, wherein the counting number is less than the plural number, (5) sorting within the one or more databases, by the processor, within at least one of the plurality of categories, the associated textually-modified rephrasings, based on the scoring, and (6) incorporating, by the processor, the textually-modified rephrasings into summary information indicating a plurality of the plurality of categories, and for each of the indicated plurality of categories, associated textually-modified rephrasings ordered consistent with the sorting, and (g) transmitting, to a user device, the summary information, to be displayed.

In accordance with further exemplary embodiments of the invention, the obtaining, by the computer system, the diarized version of the transcript of the conversation, may be performed by generating, by the computer system, from a recorded or streaming conversation, the diarized version of the transcript of the conversation.

In accordance with yet further exemplary embodiments of the inventions, the classifier algorithm includes at least one machine learning algorithm trained according to at least one training set comprising a plurality of text segments tagged with respective indications of a specific classification from amongst the plurality of predetermined classifications.

In accordance with additional exemplary embodiments of the invention, at least one of the first plurality of textual monologues may be classified according to more than classification from amongst the plurality of predetermined classifications. At least one other of the first plurality of textual monologues may be classified according to exactly one classification from amongst the plurality of predetermined classifications. At least one other of the first plurality of textual monologues may be classified according to zero classifications from amongst the plurality of predetermined classifications.

In accordance with exemplary embodiments of the invention, the plurality of predetermined classifications may include at least one of: a role of a person, a responsibility of a person, a buyer's pain, a buyer's concern, an objection, an action item, and a coaching opportunity.

In accordance with further exemplary embodiments of the invention, the classifier algorithm, in determining the one or more classifications for a first textual monologue of the first plurality of textual monologues, further employs context information derived from a second textual monologue of the first plurality of textual monologues. The context information may be a referential relationship, identified by the processor, between a pronoun in the first textual monologue and a noun in the second textual monologue.

In accordance with further exemplary embodiments of the invention, the classifier algorithm, in determining the one or more classifications for a first textual monologue of the first plurality of textual monologues, may further employ context information derived from a second textual monologue of the second plurality of textual monologues. The context information may be a referential relationship, identified by the processor, between a pronoun in the first textual monologue and a noun in the second textual monologue. The context information may be a question-and-response relationship, identified by the processor, between a question in the first textual monologue and a response in the second textual monologue.

In accordance with yet further exemplary embodiments of the invention, at least one of the textually-modified rephrasings may be a sentence.

In accordance with additional exemplary embodiments of the invention, the creating the textually-modified rephrasings may be performed, by the processor, by an algorithm receiving the respective associated textual monologue and the respective associated at least one classification as inputs. The algorithm may be at least one of: seq2seq recurrent neural network, a long short-term memory network, a transformer-based model, a bidirectional and auto-regressive transformer architecture, an encoder-decoder transformer-based architecture, and template filling.

In accordance with yet additional exemplary embodiments of the invention, the creating the textually-modified rephrasings may be selectively performed, by the processor, by one of a plurality of algorithms, selected according to the respective associated at least one classification, receiving the respective associated textual monologue as an input. The at least one of the plurality of algorithms may be at least one of: seq2seq recurrent neural network, a long short-term memory network, a transformer-based model, a bidirectional and auto-regressive transformer architecture, an encoder-decoder transformer-based architecture, and template filling.

In accordance with exemplary embodiments of the invention, the creating the textually-modified rephrasings, by the processor, may further be based on an identity or role of the respective speaker.

In accordance with further exemplary embodiments of the invention, the incorporating, by the processor, the textually-modified rephrasings into the summary information, may involve concatenating the textually-modified rephrasings within at least one of the plurality of categories.

In accordance with yet further exemplary embodiments of the invention, the scoring may be increased according to increased associated cluster size for the at least one clustering.

In accordance with additional embodiments of the invention, the scoring may also be based at least on an occurrence of specified wording in the associated textual monologue.

In accordance with further embodiments of the invention, the scoring may also be based at least on a length of the associated textual monologue.

In accordance with yet further embodiments of the invention, the scoring may also be based at least on an amount of speaking time associated with the associated textual monologue.

In accordance with other embodiments of the invention, the scoring may also be based at least on a relative positioning of the associated textual monologue within the diarized version of the transcript of the conversation. The scoring may be increased according to the relative positioning being closer to the middle of the conversation or decreased according to the relative positioning being closer to the beginning of the conversation or end of the conversation.

In accordance with additional embodiments of the invention, at least one of the textually-modified rephrasings incorporated into the summary information may include at least one link to a corresponding portion of the diarized version of the transcript.

In accordance with further embodiments of the invention, at least one of the textually-modified rephrasings incorporated into the summary information may include at least one link to a corresponding portion of an audio or audio-video recording of the conversation.

In accordance with yet further embodiments of the invention, the method further involves formatting, by the processor, within the one or more databases, the summary information into a document format configured for display on the user device.

The systems, methods, software, and other discussion herein can be applied in a variety of contexts. For example, in embodiments, they may be employed in sales, human resources (for example to the interviewing and hiring of candidates, making of promotional decisions, and managing intra-personnel conflict, to name a few), technical (for example, product development), and customer service, to name a few. For example, in embodiments, in a scenario involving the evaluation of a candidate for hiring, topics, questions, or key words used to successfully get a candidate to agree to accept a job, determined for example by a statistical analysis of such items and their correlation with a successful outcome, may be presented to an interviewer prior to, or during a call with the candidate. In additional embodiments, a relevant summarization of the interview may be presented to the decisionmaker as to whether to hire the candidate, with key organized responses, in categories determined to be critical to hire decisions, so as to enable easier evaluation of the candidate for purposes of extending or not extending an offer. In embodiments, particular key-words may be searched for in the transcript and emphasized to the decisionmaker, for example key-words that tend to be used by successful candidates (for example, particular skills that are required for the role) or tend to be used by unsuccessful candidates (for example, inappropriate or aggressive language).

In other embodiments, these approaches could be used in a focus group, (for example one conducted over the Internet) to narrow in on key questions and determine high-quality meeting participants to invite to future groups. Likewise, these approaches could be used to handle conversations with customers as to their product or service complaints.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method for generating a categorized, ranked, condensed summary of a transcript, the method comprising:
   (a) receiving, by a computer system, an input of content from a transcript of a conversation, by:
      (1) obtaining, by the computer system, a diarized version of the transcript of the conversation, the diarized version comprising:

(a) a first plurality of textual monologues of a first speaker in the conversation associated with an indication of the first speaker; and
(b) a second plurality of textual monologues of a second speaker in the conversation associated with an indication of the second speaker; and
(2) storing, by a processor of the computer system, at least the first plurality of textual monologues and the second plurality of textual monologues in one or more databases located in one or more memories operatively connected to the processor;
(b) determining, by the processor, one or more classifications, from amongst a plurality of predetermined classifications, as to each textual monologue of the first plurality of textual monologues and as to each textual monologue of the second plurality of textual monologues, based on a classifier algorithm employing natural language processing;
(c) associating, by the processor, within the one or more databases, each textual monologue of the first plurality of textual monologues and each textual monologue of the second plurality of textual monologues with the respective one or more classifications;
(d) creating by the processor, textually-modified rephrasings, for one or more of the first plurality of textual monologues and for one or more of the second plurality of textual monologues, based on respective text of the textual monologue and at least one of the respective one or more classifications of the textual monologue;
(e) storing, by the processor, the textually-modified rephrasings, in the one or more databases;
(f) aggregating the textually-modified rephrasings, by:
(1) sorting, by the processor, within the one or more databases, the textually-modified rephrasings into a plurality of categories based on the respective one or more classifications;
(2) determining, by the processor, using a clustering algorithm, at least one clustering in the one or more databases of a plurality of same or similar textually-modified rephrasings within at least one the plurality of categories;
(3) scoring, by the computer system, a plurality of textually-modified rephrasings in the one or more databases based at least on the at least one clustering;
(4) converting, in the one or more databases, by the processor, a plural number of same or similar textually-modified rephrasings within at least one of the plurality of categories, into a counting number of textually-modified rephrasings, based on the at least one clustering, wherein the counting number is less than the plural number;
(5) sorting within the one or more databases, by the processor, within at least one of the plurality of categories, the associated textually-modified rephrasings, based on the scoring; and
(6) incorporating, by the processor, the textually-modified rephrasings into summary information indicating a plurality of the plurality of categories, and for each of the indicated plurality of categories, associated textually-modified rephrasings ordered consistent with the sorting; and
(g) transmitting, to a user device, the summary information, to be displayed.

2. The method of claim 1, wherein the step of obtaining, by the computer system, the diarized version of the transcript of the conversation, is performed by generating, by the computer system, from a recorded or streaming conversation, the diarized version of the transcript of the conversation.

3. The method of claim 1, wherein the classifier algorithm comprises at least one machine learning algorithm trained according to at least one training set comprising a plurality of text segments tagged with respective indications of a specific classification from amongst the plurality of predetermined classifications.

4. The method of claim 1, wherein at least one of the first plurality of textual monologues is classified according to more than classification from amongst the plurality of predetermined classifications.

5. The method of claim 4, wherein at least one other of the first plurality of textual monologues is classified according to exactly one classification from amongst the plurality of predetermined classifications.

6. The method of claim 4, wherein at least one other of the first plurality of textual monologues is classified according to zero classifications from amongst the plurality of predetermined classifications.

7. The method of claim 1, wherein the plurality of predetermined classifications comprise at least one of: a role of a person, a responsibility of a person, a buyer's pain, a buyer's concern, an objection, an action item, or a coaching opportunity.

8. The method of claim 1, wherein the classifier algorithm, in determining the one or more classifications for a first textual monologue of the first plurality of textual monologues, further employs context information derived from a second textual monologue of the first plurality of textual monologues.

9. The method of claim 1, wherein the classifier algorithm, in determining the one or more classifications for a first textual monologue of the first plurality of textual monologues, further employs context information derived from a second textual monologue of the second plurality of textual monologues.

10. The method of claim 8, wherein the context information is a referential relationship, identified by the processor, between a pronoun in the first textual monologue and a noun in the second textual monologue.

11. The method of claim 9, wherein the context information is a referential relationship, identified by the processor, between a pronoun in the first textual monologue and a noun in the second textual monologue.

12. The method of claim 9, wherein the context information is a question-and-response relationship, identified by the processor, between a question in the first textual monologue and a response in the second textual monologue.

13. The method of claim 1, wherein at least one of the textually-modified rephrasings is a sentence.

14. The method of claim 1, wherein the creating the textually-modified rephrasings is performed, by the processor, by an algorithm receiving the respective associated textual monologue and the respective associated at least one classification as inputs.

15. The method of claim 1, wherein the creating the textually-modified rephrasings is selectively performed, by the processor, by one of a plurality of algorithms, selected according to the respective associated at least one classification, receiving the respective associated textual monologue as an input.

16. The method of claim 1, wherein the creating the textually-modified rephrasings, by the processor, is further based on an identity or role of the respective speaker.

17. The method of claim 14, wherein the algorithm is at least one of: seq2seq recurrent neural network, a long short-term memory network, a transformer-based model, a bidirectional and auto-regressive transformer architecture, an encoder-decoder transformer-based architecture, or template filling.

18. The method of claim 15, wherein at least one of the plurality of algorithms is at least one of: seq2seq recurrent neural network, a long short-term memory network, a transformer-based model, a bidirectional and auto-regressive transformer architecture, an encoder-decoder transformer-based architecture, or template filling.

19. The method of claim 1, wherein the step of incorporating, by the processor, the textually-modified rephrasings into the summary information, comprises concatenating the textually-modified rephrasings within at least one of the plurality of categories.

20. The method of claim 1, wherein the scoring is increased according to increased associated cluster size for the at least one clustering.

21. The method of claim 1, wherein the scoring is also based at least on an occurrence of specified wording in the associated textual monologue.

22. The method of claim 1, wherein the scoring is also based at least on a length of the associated textual monologue.

23. The method of claim 1, wherein the scoring is also based at least on an amount of speaking time associated with the associated textual monologue.

24. The method of claim 1, wherein the scoring is also based at least on a relative positioning of the associated textual monologue within the diarized version of the transcript of the conversation.

25. The method of claim 24, wherein the scoring is increased according to the relative positioning being closer to the middle of the conversation or decreased according to the relative positioning being closer to the beginning of the conversation or end of the conversation.

26. The method of claim 1, wherein at least one of the textually-modified rephrasings incorporated into the summary information comprises at least one link to a corresponding portion of the diarized version of the transcript.

27. The method of claim 1, wherein at least one of the textually-modified rephrasings incorporated into the summary information comprises at least one link to a corresponding portion of an audio or audio-video recording of the conversation.

28. The method of claim 1, further comprising formatting, by the processor, within the one or more databases, the summary information into a document format configured for display on the user device.

* * * * *